Sept. 26, 1939.   F. C. PICUT   2,173,979
COMBINED FLOW REGULATOR AND FAUCET
Original Filed Nov. 26, 1937
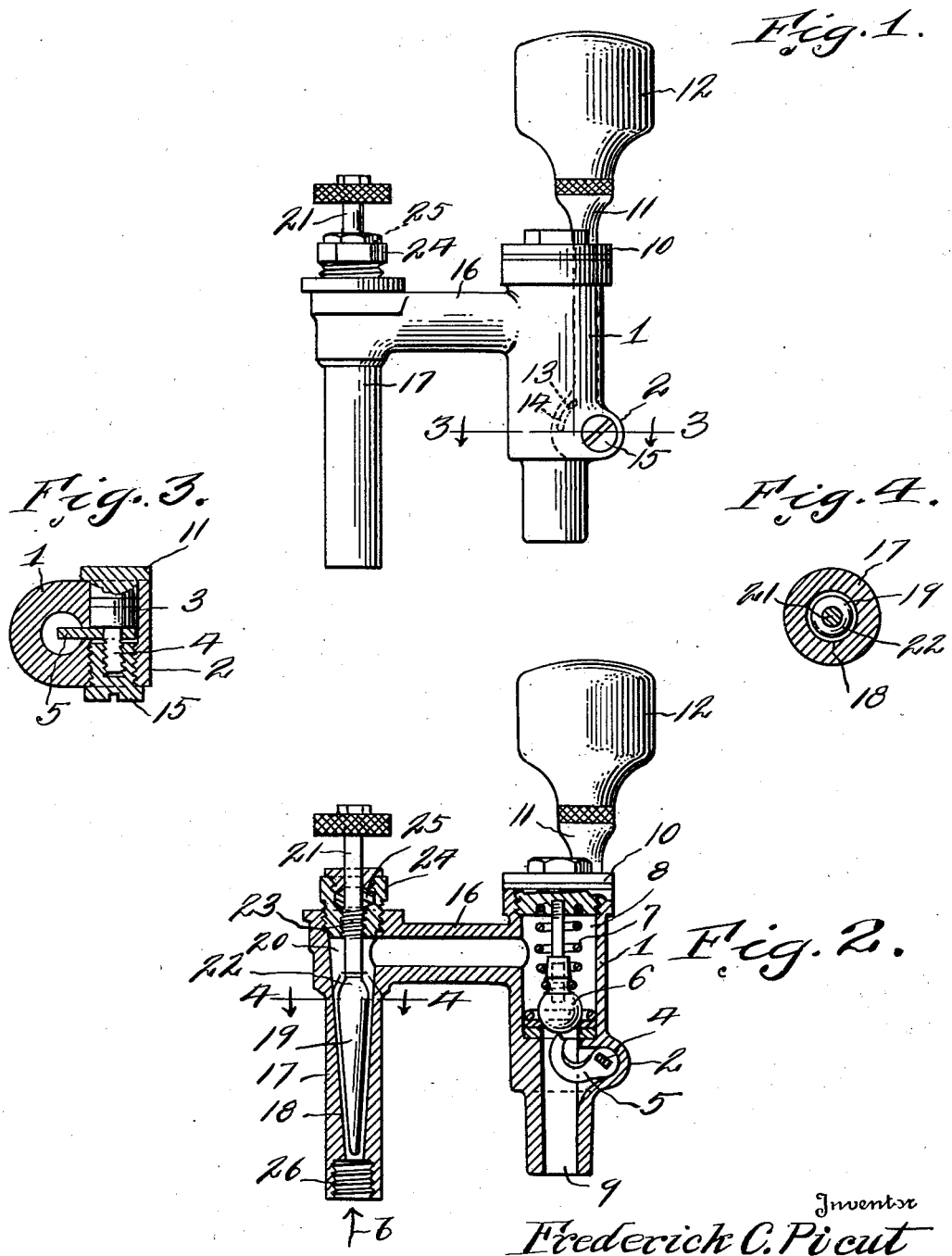

Patented Sept. 26, 1939

2,173,979

UNITED STATES PATENT OFFICE 2,173,979

COMBINED FLOW REGULATOR AND FAUCET

Frederick C. Picut, Newark, N. J., assignor to Economy Faucet Co., Newark, N. J., a corporation of New Jersey Original application November 26, 1937, Serial No. 176,704. Divided and this application May 23, 1938, Serial No. 209,571

2 Claims. (Cl. 225—3)

The invention relates to combined flow regulators and faucets of the dispensing type, and has for its object to provide a device of this character wherein the flow regulator is part of the faucet unit.

A further object is to place the flow regulator relatively close to the faucet to reduce the possibility of the beer foaming in passing through the faucet.

A further object is to provide the dispensing faucet casing with a relatively short branch pipe, terminating in a flow regulator casing having a flow regulator member therein.

A further object is to provide, as a unit, a dispensing faucet and a flow regulator, which may be applied to a discharge pipe, thereby obviating the present practice of placing flow regulators in the dispensing pipe remote to the faucet.

A further object is to provide a flow regulator in connection with the faucet casing on the intake side thereof and by manipulation of the flow regulator the amount of fluid passing to the faucet may be limited. Also to so shape the flow regulator whereby a tapered annular passage is formed by a tapered valve cooperating with a tapered bore, and to curve the upper end of the valve inwardly so the curved surface will merge into the valve stem, thereby allowing the gaseous material, for instance beer, to expand above the valve with a minimum amount of turbulence before it is discharged to the faucet.

A further object is to form the regulator valve relatively long and of minimum diameter, thereby limiting, as far as possible, the spread of the annular column as it is discharged above the valve.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the combined flow regulator and faucet.

Figure 2 is a vertical longitudinal sectional view through the regulator and faucet.

Figure 3 is a horizontal sectional view taken on line 3—3 of Figure 1.

Figure 4 is a horizontal sectional view taken on line 4—4 of Figure 2.

The present application is a divisional part of my application, Serial No. 176,704, filed November 26, 1937.

The numeral 1 designates the casing of the faucet, which casing is provided with an extension 2 on its front side, and in which is rotatably mounted a member 3 having a threaded extension 4, angular shaped in cross section, and extends through an arcuately shaped valve lifting arm 5, which when rocked upwardly engages the under side of a ball valve 6 and unseats the same against the action of an expansion spring 7 for allowing discharge of fluid, for instance beer from the chamber 8 of the faucet, to the discharge passage 9 of the casing. Threaded on the upper end of the casing 1 is a cap 10.

Extending upwardy from the rotatable member 3 is a handle 11, which terminates in a knob 12, adapted to be gripped by the operator for manipulating the valve, during a dispensing operation. The movement of the handle member 11 is limited by means of a lug 13, carried by the casing side 1, and which lug extends into an arcuate slot in the handle member 11, as shown in dotted lines in Figure 1.

Threaded on the threaded extension 4 and into the lug 2 is a retaining screw 15, which holds the parts assembled, and at the same time allows ready access to the parts.

In devices heretofore constructed, it has been necessary to place the regulator somewhere in the pipe line remote in relation to the dispensing faucet. Where this is done the beer, after passing the regulator, may again foam and form relatively high collars on glasses of beer. To obviate this difficulty the regulator is placed as close as possible to the faucet, and the regulator and faucet formed as a unit. It is understood the faucet may be angularly positioned in relation to the regulator if desired.

Fluid enters the upper end of the chamber 8 through the intake pipe 16, and is discharged at 9 from the faucet. The intake pipe 16 terminates in a vertically disposed fluid regulator casing 17 having a relatively narrow elongated tapered bore 18, with which a relatively narrow elongated valve 19 cooperates for allowing the passage of a vertical conical, relatively narrow column of fluid in the direction of the arrow $b$ to the intake pipe 16. It has been found, by forming the valve 19 relatively long and narrow, a slight taper may be used, thereby reducing the distance of flow of the column parts as the fluid commingles into the upper end 20 around the valve stem 21, consequently reducing turbulence in the upper end of the chamber to a minimum.

To further reduce the turbulence at this point and consequent foaming of the beer, the upper end 22 of the valve curves inwardly and merges into the stem without the formation of a shoulder, hence it will be seen that the foaming of the gaseous fluid, for instance beer will be reduced to a minimum. Regulator valve stem 21 is threaded at 23 through the removable cap 24, threaded into the upper end of the valve casing 17, therefore it will be seen that all of the parts may be removed from the casing 17 for repair, cleaning and replacement purposes. If desired, the removable cap 24 may be provided with a packing gland 25.

From the above it will be seen that a combined faucet and flow regulator is provided, as a unit, which may be easily and quickly attached to a discharge pipe at the threaded end 26 of the regulator casing 17. It will also be seen that the regulator valve is proportioned and shaped whereby a minimum amount of foam is allowed to form before the fluid passes to the dispensing faucet.

The invention having been set forth what is claimed as new and useful is:

1. A combined flow regulator and dispensing faucet formed as a single unit, said unit comprising spaced faucet and regulator casings having their intake and discharge ends in reverse relation, an integral member connecting the discharge end of the regulator casing and the intake end of the faucet and through which fluid passes from the regulator casing to the faucet casing, a regulator valve in the regulator casing and a valve in the faucet casing.

2. A unit flow regulator and dispensing faucet comprising a vertically disposed flow regulator casing, a dispensing faucet casing, an integral member connecting the upper ends of said casings to each other and having a port in communication with the chambers of the casings, a flow regulator valve in the flow regulator casing and cooperating with a valve seat and a valve in the dispensing faucet casing cooperating with a seat therein.

FREDERICK C. PICUT.